(12) United States Patent (10) Patent No.: US 8,768,645 B2
Van Rijnswou (45) Date of Patent: Jul. 1, 2014

(54) ESTIMATING TEMPERATURE OF MEMORY ELEMENTS

(75) Inventor: Sander Matthijs Van Rijnswou, Veldhoven (NL)

(73) Assignee: NXP B.V., Eindhoven (NL)

( * ) Notice: Subject to any disclaimer, the term of this patent is extended or adjusted under 35 U.S.C. 154(b) by 481 days.

(21) Appl. No.: 12/808,424

(22) PCT Filed: Oct. 27, 2008

(86) PCT No.: PCT/IB2008/054421
§ 371 (c)(1),
(2), (4) Date: Jun. 16, 2010

(87) PCT Pub. No.: WO2009/077894
PCT Pub. Date: Jun. 25, 2009

(65) Prior Publication Data
US 2010/0292949 A1    Nov. 18, 2010

(30) Foreign Application Priority Data

Dec. 17, 2007 (EP) .................................... 07123395

(51) Int. Cl.
*G01K 1/00* (2006.01)
*G01K 7/42* (2006.01)
(52) U.S. Cl.
CPC *G01K 7/425* (2013.01); *G01K 7/42* (2013.01); *G01K 7/427* (2013.01)
USPC .......................................... 702/130; 374/178
(58) Field of Classification Search
CPC ......... G01K 7/42; G01K 7/425; G01K 7/427; G06F 11/3058
USPC ................... 702/130; 374/134, 159, 170, 178
See application file for complete search history.

(56) References Cited

U.S. PATENT DOCUMENTS 5,375,093 A * 12/1994 Hirano .......................... 365/222
5,566,117 A * 10/1996 Okamura et al. ............. 365/222
6,002,627 A * 12/1999 Chevallier ..................... 365/212

(Continued)

OTHER PUBLICATIONS

"What is a smart card?" Apr. 1, 2000. HowStuffWorks.com. <http://www.howstuffworks.com/question332.htm> May 15, 2012.*

(Continued)

*Primary Examiner* — John Breene
*Assistant Examiner* — Timothy H Hwang (57) ABSTRACT

The invention relates to a method for determining a temperature (T) of a plurality of memory elements (10) having a temperature-dependent probability (P) of assuming a particular bit value, the method comprising: triggering (110) the plurality of memory elements (10) to assume the particular bit value; reading out (120) the contents of the plurality of memory elements (10) to obtain read data (D), and processing (130) the read data (D) for determining a value (Vact) indicative of the temperature (T). The invention also relates to a program product comprising instructions for causing a processor to perform the method. Such computer program is advantageously used in a smartcard, which then does not need any structural modification at all. The invention further relates to a system for determining a temperature (T) of a plurality of memory elements (10). Such system is advantageously implemented in an integrated circuit, wherein the plurality of memory elements (10) forms part of an integrated memory. The invention provides that temperature (T) can be determined without the need for a separate temperature sensor. The only real requirement is the presence of a plurality of memory elements (10) having a temperature-dependent probability (P) of assuming particular bit value.

21 Claims, 5 Drawing Sheets

(56) References Cited

U.S. PATENT DOCUMENTS

| | | | |
|---|---|---|---|
| 6,877,897 B2* | 4/2005 | Braun et al. | 374/178 |
| 7,191,088 B1 | 3/2007 | Reed et al. | |
| 7,630,267 B2* | 12/2009 | Chen | 365/211 |
| 7,773,413 B2* | 8/2010 | Shalvi | 365/185.02 |
| 8,355,288 B2 | 1/2013 | Kim et al. | |
| 2001/0014049 A1* | 8/2001 | Woo et al. | 365/211 |
| 2003/0058016 A1 | 3/2003 | Mizugaki | |
| 2005/0036369 A1* | 2/2005 | Lee et al. | 365/185.18 |
| 2006/0066384 A1 | 3/2006 | Jain et al. | |
| 2007/0036015 A1 | 2/2007 | Sako | |
| 2007/0058435 A1 | 3/2007 | Chen et al. | |
| 2007/0133653 A1 | 6/2007 | Lee et al. | |
| 2008/0130341 A1* | 6/2008 | Shalvi et al. | 365/45 |

OTHER PUBLICATIONS

Boneh, Dan, et al; "On the Importance of Checking Cryptographic Protocols for Faults"; 1997; http://citeseer.ist.psu.edu.boneh97importance.html.

* cited by examiner

ESTIMATING TEMPERATURE OF MEMORY ELEMENTS

FIELD OF THE INVENTION

The invention relates to a method for determining a temperature, a method of calibration, a computer program product comprising instructions for causing a processor to perform any one of these methods, and to a smart card comprising a memory having stored thereon such computer program product. The invention further relates to a system for determining a temperature, and to an integrated circuit comprising such system.

BACKGROUND OF THE INVENTION

Methods and systems for determining a temperature are known. In electronic applications where a temperature needs to be determined such method may comprise the provision of a lumped temperature sensor which provides an output value that is indicative of the temperature. In the prior art many different temperature sensors have been reported that may be used in such methods and systems.

A disadvantage of the known methods and systems for determining the temperature is that they need an additional temperature sensor. When such temperature sensor is not available or when the one which is available is not functioning properly, no temperature can be determined.

SUMMARY OF THE INVENTION

It is an object of the invention to provide a method of determining a temperature without needing a separate temperature sensor.

The invention is defined by the independent claims. The dependent claims define advantageous embodiments.

In a first aspect, the invention relates to a method for determining a temperature of a plurality of memory elements having a temperature-dependent probability of assuming a particular bit value, the method comprising:
  triggering the plurality of memory elements to assume the particular bit value;
  reading out the contents of the plurality of memory elements to obtain read data, and
  processing the read data for determining a value indicative of the temperature.

The effect of the features of the method according to the invention is that, instead of providing a separate temperature sensor, temperature-dependence of a physical phenomenon is used for determining the temperature. The physical phenomenon that is used is the probability of the assumption of the particular bit value of the plurality of memory elements, after that the assumption has been triggered. It is the insight of the inventor that for particular memory elements the probability of assuming a particular bit value shows a substantial linear dependence on the temperature. A consequence of this is that the contents, after having been read out, of the plurality of memory elements can be easily processed such that a value is determined that is indicative of the temperature.

An embodiment of the method according to the invention further comprises mapping the value onto the temperature based upon a temperature dependency of the value. This embodiment is very advantageous in applications where the actual temperature has to be determined.

In another embodiment of the method according to the invention the triggering of the plurality of memory elements is performed by initiating an operating state transition of the plurality of memory elements. In a first variant of this embodiment of the method the plurality of memory elements are SRAM memory cells or flip-flops, and the initiating of the operating state transition comprises switching the plurality of memory elements from their off-state to their on-state such that the plurality of memory elements assume the bit value. When an static-random-access-memory (SRAM) is switched on (e.g. by applying a supply voltage) some cells will assume a logical "1" as bit value, while others will assume a logical "0" as bit value, the probability of these events being temperature dependent as described above. In a second variant of the embodiment of the method the plurality of memory elements are DRAM memory cells, and the initiating of the operating state transition comprises preventing refresh of the plurality of memory elements for a predefined period of time such that some of the plurality of memory elements no longer retain the bit-value. A dynamic-random-access-memory (DRAM) needs regular refresh operations in order to let the memory cells retain their data. If the refresh operation is delayed (i.e. the refresh cycle time is temporarily increased) some of the plurality of memory cells will have a tendency to retain their bit value while others change bit value. In an example embodiment a charged capacitance in a memory cell represents a logical "1" and a non-charged capacitance represents a logical "0". In that case, after the predetermined period of time (longer than the normal refresh cycle time) some memory cells will assume a logical "0" whereas others will retain their original bit value "1", also the probability of these events is temperature dependent. It must be noted that only those memory cells having a charged capacitance (which may represent either one of the bit values "0" and "1") are of interest in the invention, because the other cells do not have a bit value that is dependent on the refresh cycle time.

The invention, in a second aspect, relates to a method of calibration for determining the dependency, the method comprising:
  a) setting a temperature to a predefined level, and
  b) performing the method according to the invention.

This embodiment is advantageous in situations where, for example, a slope of the dependency is known, but not the absolute value for specific temperatures. In such situation, the dependency can be simply determined by measuring the value indicative of the temperature at a single temperature, i.e. the environmental temperature of a factory. This particular value together with the known slope of the dependency uniquely determines the dependency.

In a further embodiment of the method of calibration for determining the dependency, the method further comprises:
  c) repeating part a) and b) for different temperatures, and
  d) determining the dependency of the value on the temperature.

This method is very advantageous in the situation that the temperature dependency of the probability of assuming a particular bit value is not known or prone to large variability when considering a multiple groups of memory elements. The methods of calibration according to the invention may be followed by the earlier mentioned method for determining a temperature. Calibration before performing the method of estimating the temperature renders it possible to determine the actual temperature more accurately.

An embodiment of the method of the last mentioned method of calibration for determining the dependency comprises, before the triggering of the plurality of memory elements, selecting the plurality of memory elements based on a predetermined minimum temperature-dependence of the probability of the assuming of the particular bit-value. The advantage of this embodiment is that the temperature-dependence of the value is made larger, because memory cells which do not show a temperature-dependent probability (i.e. memory cells that assume a same bit value over the complete temperature range of interest) can be left out.

In a third aspect the invention relates to a computer program product comprising instructions for causing a processor to perform the method according to the invention. In many applications, a memory (having a plurality of memory cells, SRAM or DRAM) as well as a processor is available. The invention is very easily implemented in those systems by simply writing new software for the processor such that the processor carries out the method according to the invention. There is no need to change any hardware. The software may be stored on any storage means available like, an embedded or stand-alone Flash memory, a Programmable ROM memory, a hard disk, or a even a commercial Flash-card.

In a fourth aspect the invention relates to a smart card comprising a memory having stored thereon the computer program product. A possible application of the invention is that the temperature obtained by the method is used as an input to the post processing software for key storage using physically uncloneable functions (PUFs). The post processing is needed in order to obtain a stable key. In the post processing phase the temperature dependency of the probability of a particular bit value (e.g. a logical "1") can be used to bias towards the number of 1's needed.

In a fifth aspect the invention relates to a system for determining a temperature of a plurality of memory elements, the system comprising:

the plurality of memory elements having a temperature-dependent probability of assuming a particular bit value;
trigger circuitry connected to the plurality of memory elements for triggering the plurality of memory elements to assume the particular bit value, and
processing circuitry connected to the plurality of memory elements for reading out the contents of the plurality of memory elements to obtain read data, and for processing the read data for determining a value indicative of the temperature.

The system provides a convenient implementation for carrying out the method according to the invention. The system benefits from similar advantages as the method according to the invention. Embodiments of the system benefit from similar advantage as the corresponding embodiments of the method according to the invention.

An embodiment of the system in accordance with the invention comprises mapping circuitry connected to the processing circuitry for mapping the value to the temperature based upon a dependency of the value on the temperature. In a first variant the mapping circuitry comprises a controller for receiving the value indicative of the temperature from the processing circuitry and a look-up table connected to the controller for storing the dependency of the value on the temperature and for providing a corresponding temperature to the controller when it receives the value. Preferably, the mapping circuitry further comprises extrapolation and/or interpolation circuitry for determining the corresponding temperature when the value indicative of the temperature is not present in the look-up table. In a second variant the mapping circuitry is arranged for performing a further operation on the value indicative of the temperature, and the further operation constitutes calculating the temperature as a function of the value indicative of the temperature, wherein the function is derived from the dependency.

In another embodiment the trigger circuitry is arranged for triggering the plurality of memory elements by initiating an operating state transition of the plurality of memory elements. In a first variant of this embodiment the plurality of memory elements are SRAM memory cells or flip-flops, and the trigger circuitry is further arranged for initiating the operating state transition by switching the plurality of memory elements from their off-state to their on-state such that the plurality of memory elements assume the bit value. In a second variant of this embodiment the plurality of memory elements are DRAM memory cells, and the trigger circuitry is further arranged for initiating the operating state transition by preventing refreshing of the plurality of memory elements for a predefined period of time such that some of the plurality of memory elements no longer retain the bit-value.

In a sixth aspect the invention relates to an integrated circuit comprising the system in accordance with the invention, wherein the plurality of memory elements forms part of an integrated memory.

These and other aspects of the invention are apparent from and will be elucidated with reference to the embodiments described hereinafter.

DETAILED DESCRIPTION OF THE PREFERRED EMBODIMENT

An SRAM comprises a plurality of memory cells (elements). When the power supply of an SRAM is switched on the bit values of the memory cells will assume a particular bit value due to the bi-stable mechanism in each memory cell. Certain cells will assume an intrinsic start-up value, like a logical "0" or a logical "1", while other cells will randomly assume either one of the bit-values. Yet other cells seem to randomly assume a bit-value, but do have a certain preferential bit value, e.g. the probability of one of the possible bit values is larger than the other. The inventor has observed that especially within this subset of memory cells the probability is temperature dependent, which has led to the idea of using this effect to determine an indication of the temperature. Flip-flops typically exhibit similar behavior as the SRAM cells. A third option is to allow charge to leak away from a DRAM for a predefined period of time.

Figure 1:
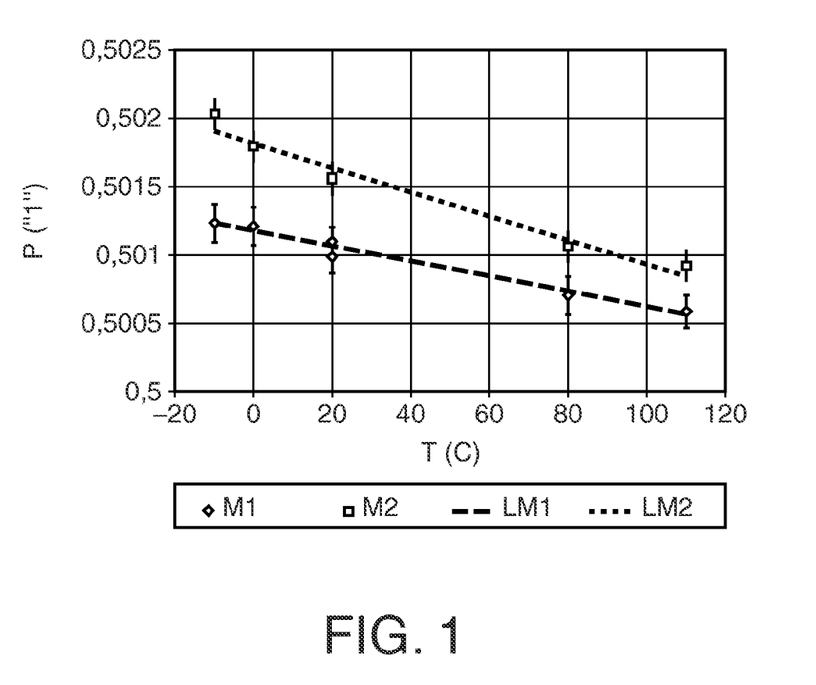
FIG. 1 shows the temperature dependency of the probability of assuming a logical "1" in two different SRAM's.

FIG. 1 shows the temperature dependency of the probability of assuming a logical "1" in two different SRAM memories M1, M2. The probability P of assuming a logical "1" for the first memory M1 is lower than that for the second memory M2. However, both memories M1, M2 show a probability P that decreases with temperature. For each memory a linear regression curve LM1, LM2 has been determined. The linear regression curves LM1, LM2 may be stored, as will be explained later, such that at a later moment the temperature can be quickly determined by simply counting the number of "1"'s (from now on also being referred to as the one-bias) after starting up the memories M1, M2. When doing linear regression on the two series coefficients of determinations are found that are very close to a value 1, namely 0.97 for the first SRAM memory M1, and 0.96 for the second SRAM memory M2. This means that the variability in the average one-bias can almost completely be explained from the temperature. It must be noted that within batches taken from a single memory and at a single temperature there is some variability, wherein a standard deviation of about 0.00013 seems typical.

Figure 2:
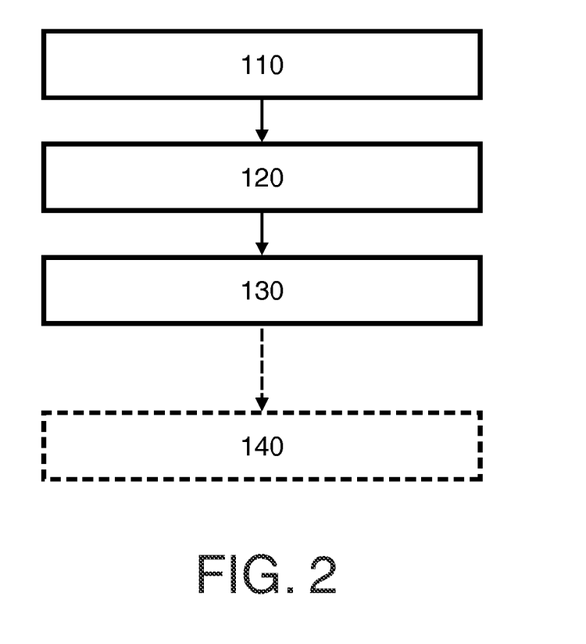
FIG. 2 shows a flow diagram illustrating a first embodiment of the method according to the invention.

FIG. 2 shows a flow diagram illustrating a first embodiment of the method according to the invention. The method must preferably be applied to a plurality of memory elements wherein at least part of the memory elements has a temperature-dependent probability of assuming a particular bit value. As illustrated above, the memory elements may be selected from the group comprising: an SRAM memory, a DRAM memory, and flip-flops (i.e. D flip-flops).

A first step 110 of the method comprises the triggering of the assuming of the particular bit value of the plurality of memory elements. The triggering may be done by initiating an operating state transition. For example, the triggering may be done by switching the plurality of memory elements on, if the memory elements are SRAM memory cells or flip-flops. Alternatively, the triggering may be done by letting charge leak away (preventing refresh, so effectively switching the SRAM memory cells off for a while) from DRAM memory cells for a predefined period of time. In order to achieve a temperature-dependent probability of the assumption of a particular bit-value it is required to consider those memory cells that have a charge stored. For those cells, the predefined period of time (wherein no refresh is done) must be longer than the average refresh cycle time required for letting the memory cells retain their data. For the invention it is not important whether a charged capacitance in a memory cell represents a logical "1" or a logical "0". That is a matter of choice for the designer.

A second step 120 of the method comprises the reading out of the contents of the plurality of memory elements to obtain read data. This is not further elucidated because it falls within the normal routine and skill of the skilled person to read or write data into memory elements.

A third step 130 of the method comprises the processing of the read data for determining a value indicative of the temperature. In this step the person may choose from many different possibilities. One way of determining such value is to simply count the number of logical "1"'s or, alternatively, the number of logical "0"'s (as these are complementary in case of a single-bit memory element). This may be done by summing up all logical values of the read data. Another way of determining the value is to calculate a weighted sum of all logical values of the read data. The weighted sum opens up the possibility to put more weight on those memory cells that have a strongly temperature-dependent probability of assuming a particular bit value, and less weight on those memory cells that have a weakly temperature-dependent probability. Such weight factors may be determined after calibration of the method. For this an iterative trial-and-error process may be used. After setting the weight factors to certain value the dependency of the temperature is determined, after which some of the weight factors are changed. Then the temperature dependency is determined again. If the temperature dependency is stronger than the previous trial, the weight factors that were changed are maintained. If the temperature dependency is weaker, the weight factors that were changed are set to their previous value.

A fourth step 140 of the method, which is optional, comprises the mapping of the value onto the temperature based upon a temperature dependency of the value. Such temperature dependency (i.e. a function of the temperature) may be either known upfront or may be (dynamically) determined by means of calibration. Calibration is further elaborated on later in this description. The fourth step is optional because in some applications it is not required to determine an absolute value of the temperature. Also, in some applications it may be enough to only distinguish certain temperature ranges. For example, it may only be required to distinguish extreme temperatures like below 10° C. or above 120° C. from temperatures that are normal (normal operating conditions). In those applications it may be needed to terminate or interrupt a particular process in order to prevent failure or vulnerable conditions (to external attacks). Detection of extreme temperatures may then be used to trigger such termination or interruption.

Figure 3:
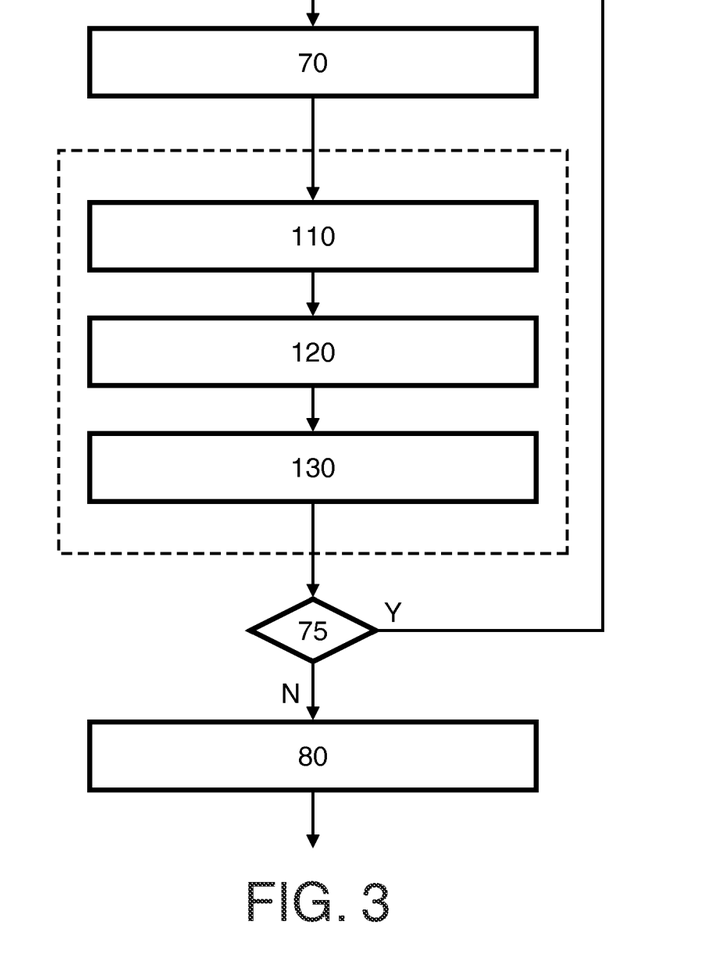
FIG. 3 shows a flow diagram illustrating a second embodiment of the method according to the invention.

FIG. 3 shows a flow diagram illustrating a second embodiment of the method according to the invention. This embodiment of the method constitutes a method of calibration for determining the dependency, which method comprises the earlier described process steps 110, 120, 130. This sequence of steps is, in this example, repeated for different temperatures. However, if the general shape of a dependency is known, and only the absolute value of the dependency is unknown, the repetition of the process steps is not required. In such situation, the dependency can be simply determined by measuring the value indicative of the temperature at a single temperature, i.e. the environmental temperature of a factory. This particular value together with the known slope of the dependency uniquely determines the dependency. Before the steps 110, 120, 130 are carried out a setting step 70 is carried out in which the temperature is set to a predefined level. After setting of the temperature the steps 110, 120, 130 are carried out which results in the value that is indicative of the temperature. It is then determined in a further step 75 if the value needs to be determined at a different temperature. If the answer is "Yes" Y then the setting step 70 and the process steps 110, 120, 130 are carried out again but at a different temperature. If the answer is "No" N a determination step 80 is carried out in which the dependency of the value on the temperature is determined. This may be done in different ways. In an embodiment of the method the temperatures and corresponding values may be stored in the form of a table. In another embodiment a fit function, i.e. a linear regression curve (but polynomial curves are also possible), may be determined that matches the measured values the best. This method results in graphs similar to the one in FIG. 1. The determined dependency of the value on the temperature may be used in the earlier described step 140 of mapping the value onto the temperature.

It must be mentioned that the invention has various embodiments, either in software or in hardware or a mixture thereof. Some embodiments constitute a method, and others constitute a system.

Figure 4:
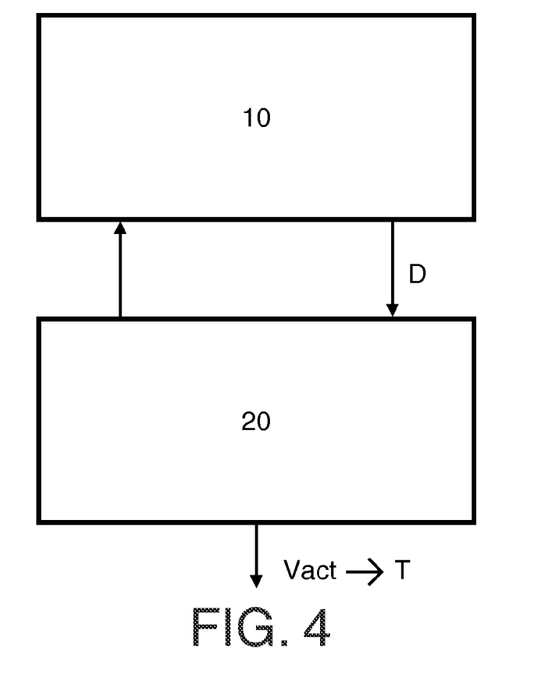
FIG. 4 shows a schematic block diagram of a first embodiment of the system according to the invention.

FIG. 4 shows a schematic block diagram of a first embodiment of the system according to the invention. The system comprises a plurality of memory elements 10 and an aggregator 20 connected to the plurality of memory elements 10. The aggregator 20 is arranged for performing the method in accordance with the invention, which means that it reads data D from the plurality of memory elements 10 after that it has triggered (using trigger circuitry (not shown) in the way earlier described) the assumption of particular bit values of the plurality of elements 10. Subsequently, the aggregator 20 performs some processing using processing circuitry (not shown) on the data D in order to obtain a value Vact. The plurality of memory elements were selected such that their probability of assuming a particular bit value is temperature-dependent. As earlier described, such memory cells are selected from a group comprising: flip-flops, SRAM memory cells, and DRAM memory cells. However, the person skilled in the art may also find different memory elements which exhibit this temperature dependent behavior. A result of temperature-dependent probability is that processing of data read out from these memory elements results in a value Vact that is indicative of the temperature, because the value Vact depends on the temperature T. In case the latter dependency is known (or at least known to a certain extent) an indication of the temperature can be obtained. Preferably the dependency is monotonous, however this is not required (especially not when in an application only extreme temperatures are of interest).

Figure 5:
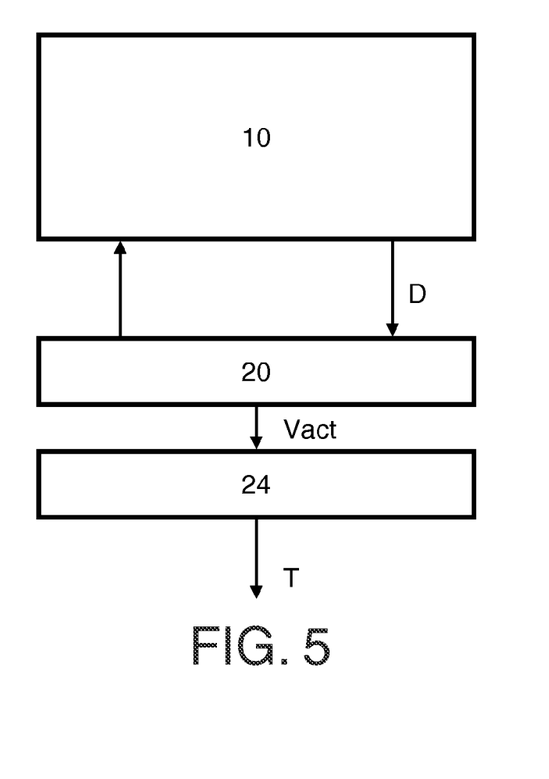
FIG. 5 shows a block diagram of a second embodiment of the system according to the invention.

FIG. 5 shows a block diagram of a second embodiment of the system according to the invention. This embodiment differs from the previously described embodiment in that it further comprises mapping circuitry 24 for mapping the value Vact to a temperature T. The mapping circuitry receives the value Vact from the aggregator 20 and obtains an actual value of the temperature T which it puts on its output (i.e. in an analog or digital representation). In some applications it may be required to determine the actual value of the temperature T. This embodiment is advantageous for those applications. For the implementation of the mapping circuitry 24 the person skilled in the art can use his normal routine and skills to arrive at something which performs the desired function.

Figure 6:
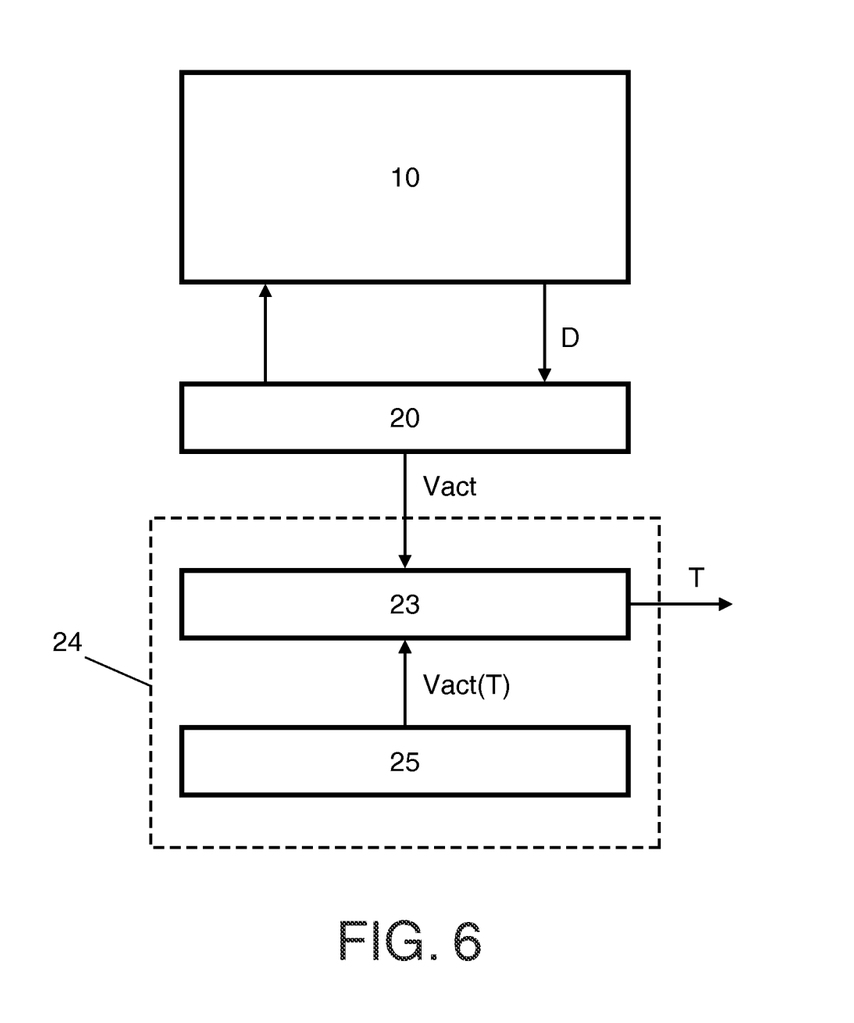
FIG. 6 shows a block diagram of a third embodiment of the system according to the invention.

FIG. 6 shows a block diagram of a third embodiment of the system according to the invention wherein an implementation of the mapping circuitry 24 is discussed in more detail. It may be advantageous to first perform, before designing the mapping circuitry 24, the method as illustrated in FIG. 3 in order to determine the dependency of the value Vact on the temperature T. Once this dependency is known, it may be stored in a suitable form, i.e. as part of the mapping circuitry 24. In FIG. 6 the dependency is stored in storage means 25. The storage means 25 may be an internal component, but may also be an external component. The mapping circuitry 24 comprises converter circuitry 23 that compares the value Vact with the stored dependency Vact(T) and generates the corresponding temperature T on its output. Alternatively, mapping circuitry 24 may be implemented such that it performs a further function on the value Vact such that the corresponding temperature T is obtained. In order to do so the further function needs to be the inverse function of the dependency Vact(T), i.e. T(Vact).

Figure 7:
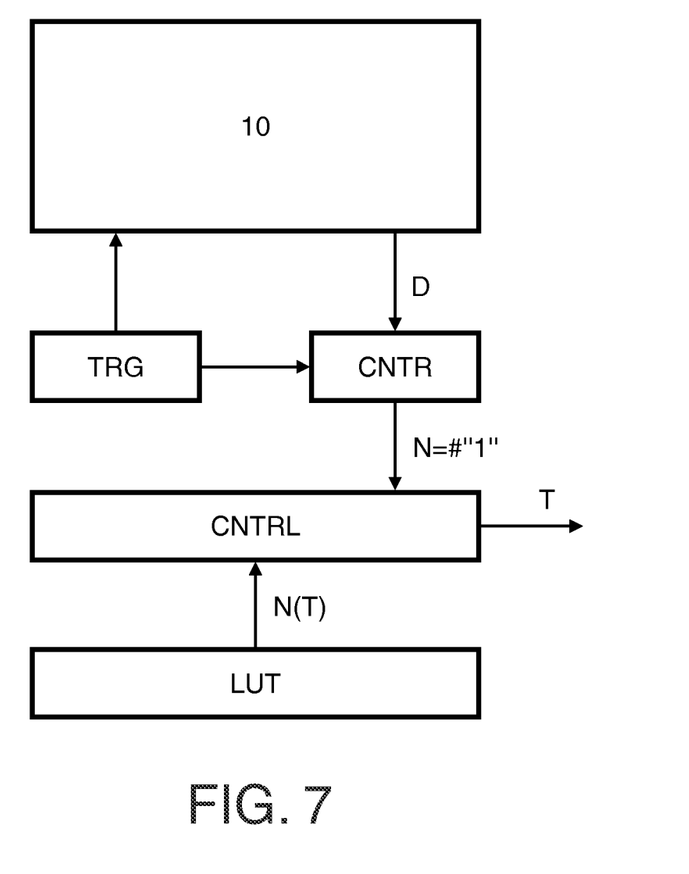
FIG. 7 shows a block diagram of a fourth embodiment of the system according to the invention.

FIG. 7 shows a block diagram of a fourth embodiment of the system according to the invention. This embodiment constitutes an advantageous implementation of the invention. The plurality of memory elements 10 (for example a plurality of SRAM memory cells) is connected with trigger circuitry TRG which is arranged to trigger the assumption of the particular bit values of the plurality of memory elements 10 (for example the trigger circuitry TRG is arranged to switch on the power supply of the plurality of memory elements 10). The contents of the plurality of memory elements 10 is read out as read data D into a counter CNTR, which in this embodiment counts the number of "1"'s in the read data D, which is also being referred to as the one-bias N. The one-bias N is provided to a controller CNTRL, which compares the one-bias N with stored values of the one-bias received from a look-up table LUT. The stored values constitute a table wherein for temperatures T a corresponding one-bias value (or a range of values) is given. Expressed differently, the controller CNTRL looks up in the look-up table LUT which temperature T corresponds to the one-bias N received from the counter CNTR. The contents of the LUT may be obtained by performing the method of calibration as illustrated in FIG. 3. Instead of counting the one-bias also the zero-bias may be determined, because these two are complementary in most memories. The principle stays the same. Optionally the system also comprises interpolation and/or extrapolation circuitry for obtaining the temperature T in case the one-bias N is not exactly matching with the contents of the look-up table. The interpolation and extrapolation circuitry may also be provided in all other embodiments described and/or claimed.

The invention thus provides, in a first aspect, a method for determining a temperature of a plurality of memory elements having a temperature-dependent probability of assuming a particular bit value and, in a second aspect, a method of calibration for determining the dependency. In a third aspect of the invention, both methods may be embodied in a computer program product comprising instructions for causing a processor to perform the method. In a fourth aspect of the invention a smart card is provided comprising a memory having stored thereon such computer program product. The invention provides, in a fifth aspect, a system for determining a temperature of a plurality of memory elements, which system is arranged to perform the method of the invention. The invention provides, in a sixth aspect, an integrated circuit comprising such system. The invention provides that temperature can be determined without the need for a separate temperature sensor. The only real requirement is the presence of a plurality of memory elements having a temperature-dependent probability of assuming particular bit value.

In case the invention is implemented in software there is no need for structural modifications. Existing hardware may be reused, for example in smart card applications. In case at least part of the invention is implemented in hardware it may be needed to add functionality, for example the blocks mentioned in this application: the aggregator, the trigger circuitry, the processing circuitry, the look-up table, the controller, the counter, etc.

Next to smart card applications, the invention may be applied in set-top boxes, mobile phones. Medical equipment and other equipment that need to be reliable. GPS receivers and other gear used outdoors.

There are other applications of the invention. For example, the temperature may be logged to provide post-mortem analysis of field failures. Such application merely involves the (regular) storage of the temperature during use. During a post-mortem analysis the temperature(s) may be read out which information may help in determining what went wrong.

In yet another application, the temperature will be used to stop the device from operating in extreme temperature circumstances. This also has security implications. During extreme temperatures the device is more prone to making errors. This may be exploitable, for example using the well-known "Bellcore attack". The invention advantageously avoids that a device operates under these attack-sensitive conditions. The Bellcore attack was first described in: Dan Boneh, Richard A. DeMillo, Richard J. Lipton, "On the Importance of Checking Cryptographic Protocols for Faults (1997)", http://citeseer.ist.psu.edu/boneh97importance.html By now many other ways compromising security by introducing faults exist.

Various variations of the method, computer program product, smart card, system and integrated circuit in accordance with the invention are possible and do not depart from the scope of the invention as claimed.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A method for determining a temperature of a memory including a plurality of memory elements having a temperature-dependent probability of assuming a particular bit value, the method comprising:
   triggering the plurality of memory elements to assume a bit value;
   reading out the contents of the plurality of memory elements to obtain read data; and
   determining a value indicative of a temperature of the memory based on the read data and information that is indicative of a temperature-dependent probability of memory elements assuming a particular bit value.

2. Method as claimed in claim 1, further comprising:
   mapping the value onto the temperature based upon a temperature dependency of the value.

3. The method as claimed in claim 1, wherein the triggering of the plurality of memory elements is performed by initiating an operating state transition of the plurality of memory elements.

4. The method as claimed in claim 3, wherein the plurality of memory elements are SRAM memory cells or flip-flops, and wherein the initiating of the operating state transition comprises switching the plurality of memory elements from their off-state to their on-state such that the plurality of memory elements assume the bit value.

5. The method as claimed in claim 3, wherein the plurality of memory elements are DRAM memory cells, and wherein the initiating of the operating state transition comprises preventing refresh of the plurality of memory elements for a predefined period of time such that some of the plurality of memory elements no longer retain the bit-value.

6. A method of calibration for determining the temperature-dependent probability comprising:
   a) setting a temperature to a predefined level, and
   b) performing the method as claimed in claim 1.

7. The method as claimed in claim 6, further comprising:
   c) repeating part a) and b) for different temperatures, and
   d) determining the dependency of the value on the temperature.

8. The method as claimed in claim 6, the method further comprising, before the triggering of the plurality of memory elements, selecting the plurality of memory elements based on a predetermined minimum temperature-dependence of the probability of the assuming of the particular bit-value.

9. A computer program product comprising instructions for causing a processor to perform the method as claimed in claim 1.

10. Smart card comprising a memory having stored thereon the computer program product as claimed in claim 9.

11. A system for determining a temperature of a memory, the system comprising:
   a plurality of memory elements having a temperature-dependent probability of assuming a particular bit value;
   trigger circuitry connected to the plurality of memory elements for triggering the plurality of memory elements to assume a bit value; and
   processing circuitry connected to the plurality of memory elements for reading out the contents of the plurality of memory elements to obtain read data, and for determining a value indicative of a temperature of the memory based on the read data and information that is indicative of the temperature-dependent probability of the memory elements assuming a particular bit value.

12. The system as claimed in claim 11, further comprising mapping circuitry connected to the processing circuitry for mapping the value to the temperature based upon a dependency of the value on the temperature.

13. The system as claimed in claim 12, wherein the mapping circuitry comprises a controller for receiving the value indicative of the temperature from the processing circuitry and a look-up table connected to the controller for storing the dependency of the value on the temperature and for providing a corresponding temperature to the controller when it receives the value.

14. The system as claimed in claim 13, wherein the mapping circuitry further comprises extrapolation and/or interpolation circuitry for determining the corresponding temperature when the value indicative of the temperature is not present in the look-up table.

15. The system as claimed in claim 12, wherein the mapping circuitry is arranged for performing a further operation on the value indicative of the temperature, wherein the further operation constitutes calculating the temperature as a function of the value indicative of the temperature, wherein the function is derived from the dependency.

16. The system as claimed in claim 11, wherein the trigger circuitry is arranged for triggering the plurality of memory elements by initiating an operating state transition of the plurality of memory elements.

17. The system as claimed in claim 16, wherein the plurality of memory elements are SRAM memory cells or flip-flops, and wherein the trigger circuitry is further arranged for initiating the operating state transition by switching the plurality of memory elements from their off-state to their on-state such that the plurality of memory elements assume the bit value.

18. The system as claimed in claim 16, wherein the plurality of memory elements are DRAM memory cells, and wherein the trigger circuitry is further arranged for initiating the operating state transition by preventing refreshing of the plurality of memory elements for a predefined period of time such that some of the plurality of memory elements no longer retain the bit-value.

19. An integrated circuit comprising the system as claimed in claim 11, wherein the plurality of memory elements forms part of an integrated memory.

20. The method of claim 1, wherein the temperature is determined without the need for a separate temperature sensor.

21. The method of claim 1, wherein the read data comprises one-bias data.

\* \* \* \* \*